United States Patent
Nookala et al.

(12) 
(10) Patent No.: US 6,510,525 B1
(45) Date of Patent: Jan. 21, 2003

(54) METHOD AND APPARATUS TO POWER UP AN INTEGRATED DEVICE FROM A LOW POWER STATE

(75) Inventors: Narasimha Nookala, Saratoga; Prahlad Venkatapuram, San Jose, both of CA (US)

(73) Assignee: Mediaq, Inc., Santa Clara, CA (US)

( * ) Notice: Subject to any disclaimer, the term of this patent is extended or adjusted under 35 U.S.C. 154(b) by 0 days.

(21) Appl. No.: 09/300,075

(22) Filed: Apr. 26, 1999

(51) Int. Cl.$^7$ ................................................ G06F 1/32
(52) U.S. Cl. ....................... 713/324; 713/320; 713/323
(58) Field of Search .................. 713/300, 310, 713/320, 322, 323, 324, 330, 340, 500, 501, 502, 600, 601

(56) References Cited

U.S. PATENT DOCUMENTS

| | | | |
|---|---|---|---|
| 5,379,382 A | * | 1/1995 | Work et al. ................... 710/63 |
| 5,493,684 A | * | 2/1996 | Gephardt et al. ........... 713/322 |
| 5,504,910 A | * | 4/1996 | Wisor et al. ................ 713/322 |
| 5,511,203 A | * | 4/1996 | Wisor et al. ................ 713/322 |
| 5,586,308 A | * | 12/1996 | Hawkins et al. ............ 713/501 |
| 5,596,756 A | * | 1/1997 | O'Brien ....................... 713/340 |
| 5,664,205 A | * | 9/1997 | O'Brien et al. ............. 713/322 |
| 5,864,702 A | * | 1/1999 | Walsh et al. ................ 713/320 |
| 5,870,621 A | | 2/1999 | Walsh et al. |
| 5,918,061 A | * | 6/1999 | Nikjou ........................ 713/324 |
| 5,925,133 A | * | 7/1999 | Buxton et al. .............. 713/323 |
| 6,212,645 B1 | * | 4/2001 | Tjandrasuwita ............. 713/330 |

FOREIGN PATENT DOCUMENTS

WO    WO 00/22501 A    4/2000

* cited by examiner

*Primary Examiner*—Xuan M. Thai
(74) *Attorney, Agent, or Firm*—Nguyen & Associates

(57) ABSTRACT

An apparatus to power up an integrated device from a low power state wherein the clock circuit for generating the internal clocks has been disabled is provided. A small set of programmable registers is reserved inside the CPU interface unit (CIF) of an integrated device (e.g., a display/graphics controller) which can be accessed by the CPU even during a low power state mode (e.g., software controlled sleep mode D3 in the preferred embodiment). The programmable registers store programmed bits that are used in indicating to the Power Management Unit (PMU) the desired power state and whether the clock circuits are to be enabled or disabled. The programmable registers also store multiplication and division factors to be used by the clock circuits in determining their clock rate. Using this information, the integrated device can go through a predetermined power sequence to transition from the low power state to the normal state which includes powering up the clock circuits (e.g., PLLs and oscillator).

14 Claims, 6 Drawing Sheets

METHOD AND APPARATUS TO POWER UP AN INTEGRATED DEVICE FROM A LOW POWER STATE

FIELD OF THE INVENTION

The invention generally relates to computer systems, and more particularly relates to processor bus interface.

BACKGROUND OF THE INVENTION

With the advances of semiconductor and computer technology, computer systems are becoming faster and at the same time smaller in size. Desk-top and even lap-top computer systems now possess processing speeds of main-frame computers that used to fill up a small room. Even hand-held computer systems such as personal digital assistants (PDA), which are becoming more popular, are getting more powerful. As computer systems become more miniaturized and inexpensive, more demands are constantly being required of them as well. One such demand is speed or performance.

As computer systems become more powerful and more miniaturized, power-conservation increasingly presents a difficult challenge to overcome. Because of their small size, hand-held computer systems are powered by batteries which have limited operating duration. Since more power is required for faster and more powerful processors, innovative solutions are required to conserve power and thereby extend the battery operating duration.

Within each computer system are many integrated circuits designed to perform different functions such as a memory controller, a hard disk controller, a graphics/video controller, a communications controller, and other peripheral controllers. As is well-known, each of these integrated circuits requires a clock signal to be used as a timing reference in synchronizing the operation of the integrated circuit. In general, power consumption increases as a result of the integrated. circuit being clocked faster.

Periodically, an integrated circuit is not needed and is idle insofar as system functionality is concerned. At other times, while a sub-circuit (e.g., combination logic and data path) that performs data processing and transferring in the integrated circuit is still running, other sub-circuits in the integrated circuit are idle. Because these sub-circuits continue to receive a clock signal, their respective internal sub-circuits continue to be exercised and consume significant power, even while they remain idle. Accordingly, to conserve power, the clock signal to idle sub-circuits is disabled. The clock signal to these sub-circuits is then enabled as necessary. Powering up (enabling) and powering down (disabling) selected sub-circuits in an integrated sub-circuit may occur in a required sequence. Such power sequencing is required because some sub-circuits are dependent on other sub-circuits. For example, a sub-circuit needs to be powered up before another sub-circuit can be powered up. Power sequencing is also required when a sub-circuit needs a sequence of input signals to turn on or off as in the case of some synchronous dynamic Random Access Memory (RAM) or a Liquid Crystal Display (LCD) flat panel monitor. Such power sequence is important because if the sequence is not done properly then some circuitry blocks will not be enabled properly. Power Management Units (PMUs) are used to provide the desired power sequencing related to a power state.

Typically, a PMU supports different power states including but is not limited to a normal power state and low power state. In the normal power state, all sub-circuits in the integrated circuit (e.g., graphics/display controller) may be enabled. Conversely, in the low power state, all sub-circuits in the integrated circuit may be disabled except for the memory buffer refresh logic for refreshing the stored data. Such a low power state is used to conserve power which is crucial in lap-top and hand-held computer systems. However, it is a challenge to power up the integrated circuit in its transition from the low power state to the normal power state because the clock circuit, which is used to generate the internal clock signals for the integrated circuit, has been turned off. A clock signal is required to power up the clock circuit. However, any internal clock that may be available in the integrated circuit during the low power state is not suitable for use in powering up the clock circuit. If the integrated circuit is coupled to a synchronous bus, an external clock signal from the synchronous bus may be available for powering up the clock circuit. On the other hand, if the integrated circuit is coupled to an asynchronous bus, no such external clock is available for powering up the clock circuit if the Phase Lock Loops (PLLs) are turned off. If the PLLs are left enabled during a low power state, they consume a lot of power which is undesirable.

Thus, a need exists for an apparatus, system, and method for powering up the integrated circuit in its transition out of the low power state when the clock circuit supplying the clock signals is turned off.

SUMMARY OF THE INVENTION

Accordingly, the present invention provides an apparatus, system, and method for powering up the integrated circuit in its transition out of the low power state when the clock circuit supplying the clock signals is turned off.

The present invention meets the above need with an integrated circuit that is coupled to a central processor. The integrated circuit comprises a processor interface, a power management circuit coupled to the processor interface circuit, and a clock generating circuit coupled to the processor interface circuit and the power management circuit.

The processor interface circuit provides an interface between the integrated circuit and the central processor. The processor interface circuit comprises a set of registers for storing programmed information from the central processor wherein the programmed information includes information on a desired power state of the integrated circuit and enabling data bits. This is the set of registers accessible during a first (low) power state. The power management circuit controls the desired power state of the integrated circuit in response to programmed information stored in the set of registers. The power management circuit supports at least the first (low) power state and a second (normal) power state. The power management circuit performs power sequencing to transition between two power states. The clock generating circuit is controlled by the power management circuit and the programmed information stored in the set of registers such that during the first power state, the clock generating circuit is substantially disabled for power conservation and during the second power state, the clock generating circuit is enabled for operating the integrated circuit.

In an alternate embodiment, the clock generating circuit may further comprise an oscillator circuit and a plurality of Phase Lock Loop (PLL) circuits coupled to the oscillator circuit. The oscillator circuit generates a reference clock signal. The plurality of PLL circuits generate derivation clock signals based on the reference clock signal. The programmed information further comprises multiplication and division factors used by the PLL circuits in generating the derivation clock signals.

All the features and advantages of the present invention will become apparent from the following detailed description of its preferred embodiment whose description should be taken in conjunction with the accompanying drawings.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention. While the following detailed description of the present invention describes its application in an embodiment involving a display/graphics controller, it is to be appreciated that the present invention is also applicable to other peripheral devices such as communications, etc.

In accordance to the present invention, a small set of programmable registers is reserved inside the CPU interface unit (CIF) of an integrated device (e.g., a display/graphics controller) which can be accessed by the CPU even during a low power state mode (e.g., software controlled sleep mode D3 in the preferred embodiment). The programmable registers store programmed bits that are used in indicating to the Power Management Unit (PMU) the desired power state and whether the clock circuits are to be enabled or disabled. The programmable registers also store multiplication and division factors to be used by the clock circuits in determining their clock rate. In other words, the programmed registers are used to define the information that is needed to allow the integrated device to go from a low power state to a normal state. Using this information and a real time clock signal PMCLKI having a slow clock rate of approximately 16 kHz, the PMU goes through a predetermined power sequence to transition from the low power state to the normal state which includes powering up the clock circuits. In so doing, the present invention can be implemented with either a synchronous processor bus or an asynchronous processor bus.

Figure 1:
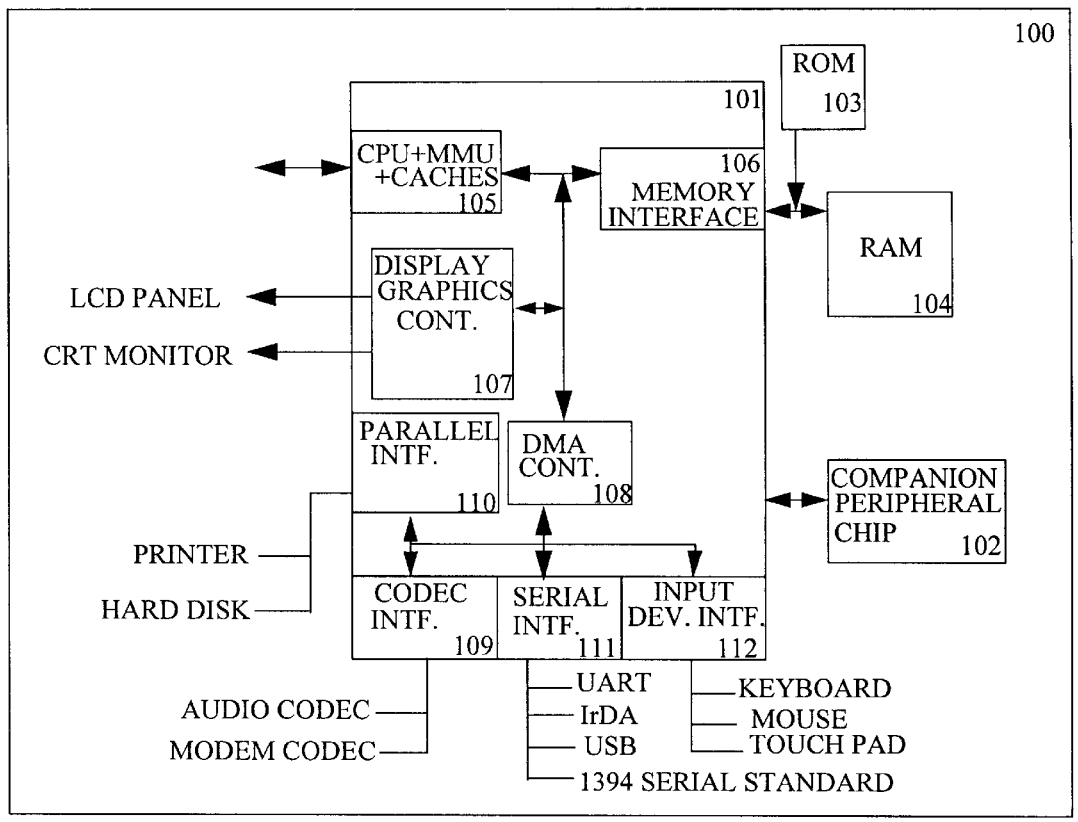
FIG. 1 is a high-level block diagram illustrating a computer system that implements the present invention.

Reference is now made to FIG. 1 which illustrates, for example, a high-level diagram of computer system 100 upon which the present invention may be implemented or practiced. More particularly, computer system 100 may be a laptop or hand-held computer system. It is to be appreciated that computer system 100 is exemplary only and that the present invention can operate within a number of different computer systems including desk-top computer systems, general purpose computer systems, embedded computer systems, and others.

As shown in FIG. 1, computer system 100 is a highly integrated system which consists of integrated processor circuit 101, peripheral controller 102, read-only-memory (ROM) 103, and random access memory (RAM) 104. The highly integrated architecture allows high performance and low power consumption. Computer system architecture 100 may also include a peripheral controller if there is a need to interface with complex and/or high pin-count peripherals that are not provided in integrated processor circuit 101.

While peripheral controller 102 is connected to integrated processor circuit 101 on one end, ROM 103 and RAM 104 are connected to integrated processor circuit 101 on the other end. Integrated processor circuit 101 comprises a processing unit 105, memory interface 106, graphics/display controller 107, direct memory access (DMA) controller 108, and core logic functions including encoder/decoder (CODEC) interface 109, parallel interface 110, serial interface 111, input device interface 112, and flat panel interface (FPI) 113. Processing unit 105 integrates a central processing unit (CPU), a memory management unit (MMU), together with instruction/data caches.

CODEC interface 109 provides the interface for an audio source and/or modem to connect to integrated processor circuit 101. Parallel interface 110 allows parallel input/output (I/O) devices such as hard disks, printers, etc. to connect to integrated processor circuit 101. Serial interface 111 provides the interface for serial I/O devices such as universal asynchronous receiver transmitter (UART) to connect to integrated processor circuit 101. Input device interface 112 provides the interface for input devices such as keyboard, mouse, and touch pad to connect to integrated processor circuit 101.

DMA controller 108 accesses data stored in RAM 104 via memory interface 106 and provides the data to peripheral devices connected to CODEC interface 109, parallel interface 110, serial interface 111, or input device interface 112. Graphics/display controller 107 requests and accesses the video/graphics data from RAM 104 via memory interface 106. Graphics/display controller 107 then processes the data, formats the processed data, and sends the formatted data to a display device such as a liquid crystal display (LCD), a cathode ray tube (CRT), or a television (TV) monitor. In computer system 100, a single memory bus is used to connect integrated processor circuit 101 to ROM 103 and RAM 104.

Figure 2:
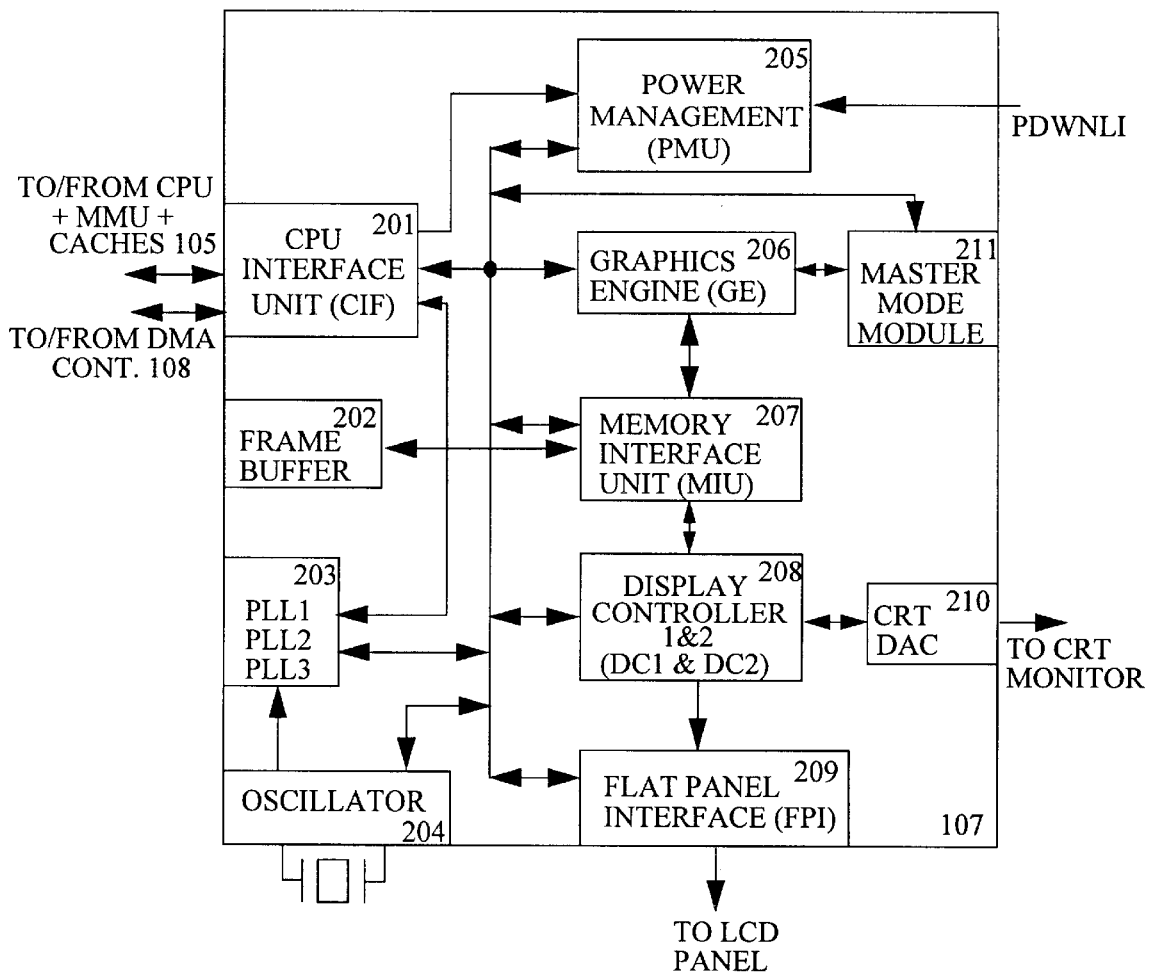
FIG. 2 is a block diagram illustrating in greater detail graphics/display controller 107 illustrated in FIG. 1.

In the preferred embodiment, the present invention is implemented as part of graphics/display controller 107. Reference is now made to FIG. 2 illustrating graphics/display controller 107 in greater detail. In general, graphics/display controller 107 comprises CPU Interface Unit (CIF) 201, frame buffer 202, Phase Lock Loop (PLL) circuit 203, oscillator 204, Power Management Unit (PMU) 205, Graphics Engine (GE) w/ FIFO Interface 206, Memory Interface Unit (MIU) 207, display controller 1&2 (DC1 & DC2) 208, Flat Panel Interface (FPI) 209, CRT Digital-to-Analog Converter (DAC) 210, and master mode module 211. CIF 201 provides the interface to processing unit 105 and DMA controller 108. Accordingly, CIF 201 routes requests and data received from processing unit 105 to the desired destination. In particular, CIF 201 sends register read/write requests and memory read/write requests from the host CPU processing unit 105 and DMA controller 108 to the appropriate modules in graphics/display controller 107. For example, memory read/write requests are passed on to MIU 207 which in turn reads/writes the data from/to frame buffer 202. CIF 201 also serves as the liaison with DMA controller 108 to fetch data from system memory (ROM 103 and RAM 104) and provides the data to GE 206 and MIU 207. Further, CIF 201 has a power mode register PMCSR that is programmable by the host CPU in processing unit 105 to control the power state of graphics/display controller 107.

Frame buffer 202 is used to store the pixmap of the image to be displayed on the monitor as well to act as a temporary buffer for various purposes. Oscillator 204 provides a reference clock signal to PLL circuit 203 which in turn generates three programmable phase lock loop clock signals PLL1, PLL2, and PLL3 for the different modules in graphics/display controller 107. More particularly, while clock signal PLL1 is used for GE 206 and MIU 207, clock signals PLL2 and PLL3 are used for display controller 1&2 (DC1 & DC2) 208. PMU 205 monitors PMCSR register in CIF 201 together with external signal PDWNLI to determine the desired power state. In turn, PMU 205 enables or disables the different modules as well as performs the required power-on and power-off sequence of the different modules as pertaining to a particular power state. GE 206 processes graphics image data which is then stored in frame buffer 202 based on commands issued by the host CPU. It should be clear to a person of ordinary skill in the art that some commands may require data both from frame buffer 202 and from system memory (e.g., a command to carry out a Raster Operation (ROP)). Master mode module 211 allows GE 206 to fetch queued commands in system memory (ROM 103 and RAM 104) which are issued by the host CPU.

MIU 207 controls all read and write transactions from/to frame buffer 202. Such read and write requests may come from the host CPU via CIF 201, GE 206, display controller 1&2 (DC1 & DC2) 208, FPI 209 etc. Display controller 208 retrieves image data from frame buffer 202 via MIU 207 and serializes the image data into pixels before outputting them to FPI 209 or CRT DAC 210. Accordingly, display controller 1&2 208 generates the required horizontal and vertical display timing signals. If the display device involved is an LCD, pixel data from display controller 208 is sent to FPI 209 before being passed on to the LCD. In the preferred embodiment, display controller 1&2 208 comprises a display controller 1 (DC1) that is normally used for a flat panel display (FPD) and a display controller 2 (DC2) that is normally used for a CRT. FPI 209 further processes the data by further adding different color hues or gray shades for display. Additionally, depending on whether a thin film transistor (TFT) LCD (a.k.a., active matrix LCD) or a super twisted nematic (STN) LCD (a.k.a., passive matrix LCD) is used, FPI 209 formats the data to suit the type of display. Furthermore, FPI 209 allows color data to be converted into monochrome data in the event a monochrome LCD is used. Conversely, if the display device is a cathode ray tube (CRT), pixel data is provided to CRT digital-to-analog converter (DAC) 210 prior to being sent to the CRT. CRT DAC 210 converts digital pixel data from display controller 208 to analog Red Green and Blue (RGB) signals to be displayed on the CRT monitor.

Figure 3:
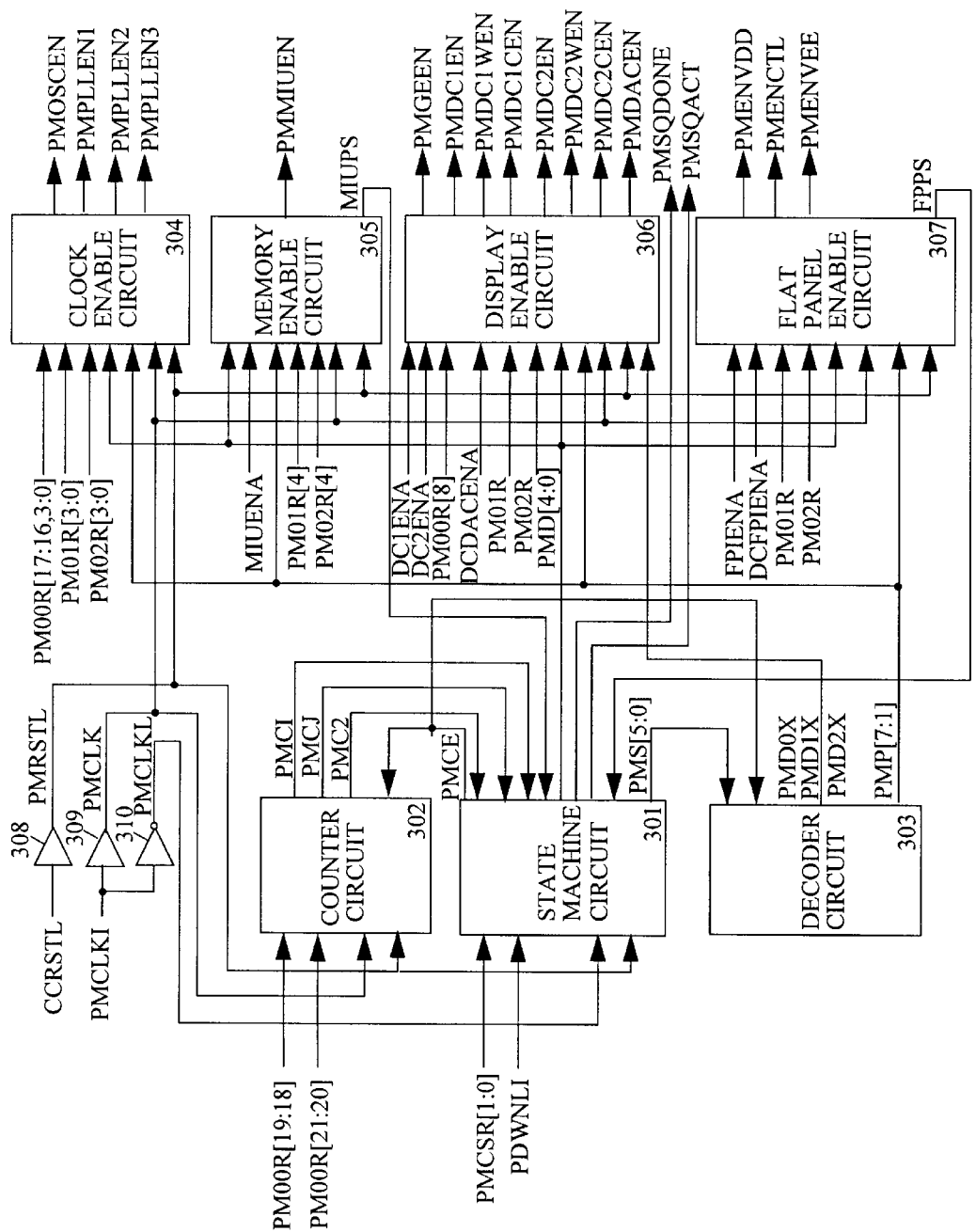
FIG. 3 is a block diagram illustrating in greater detail Power Management Unit 205 illustrated in FIG. 2.

Reference is now made to FIG. 3 illustrating in greater detail PMU 205. As shown in FIG. 3, PMU 205 includes state machine circuit 301, counter circuit 302, decoder 303, clock enable circuit 304, memory enable circuit 305, display enable circuit 306, flat panel enable circuit 307, buffers 308–309, and inverter 310. Chip reset signal CCRSTL is buffered by buffer 308 whose output signal PMRSTL is used to reset state machine circuit 301 to a default power state. Signal PMRSTL is provided as input to state machine circuit 301 and counter circuit 302. Power management clock signal PMCLKI (a.k.a. Real Time Clock Signal RTCLK) is a low speed clock and is provided as input to buffer 309 and inverter 310 which in turn output signals PMCLK and PMCLKL, respectively. Accordingly, signal PMCLKL is the invert of signals PMCLKI and PMCLK. In the present embodiment, power management clock signal PMCLKI has a speed of 16.384 kHz. At this clock rate, power management clock signal PMCLKI is not fast enough and therefore is not intended for powering up display/graphics controller 107 from a lower power state. Rather, power management clock signal PMCLKI is used by PMU 205 to generate the required timing for power sequencing.

Clock signals PMCLKL and PMCLK are provided as input to state machine circuit 301 and counter circuit 302, respectively. State machine circuit 301 is clocked on the rising edge of clock signal PMCLKL. All incoming signals of state machine circuit 301 are generated on the rising edge of clock signal PMCLK. The rising edge of signal PMCLK lags behind the rising edge of clock signal PMCLKL by 180 degrees. In so doing, sufficient set up and hold time are provided for state machine circuit 301 to minimize problems associated with clock skew thereby allowing valid information carried by its incoming signals to be latched. In addition, the output signals of state machine circuit 301 and decoded output signals generated by decoder output 303 are latched at the rising edge of clock PMCLK by enable circuits 304–307.

Counter circuit 302 is used to determine the time interval between the disabling or enabling of two circuits or modules in power sequencing. Such time interval is required to ensure that a circuit/module is enabled or disabled properly. In accordance to the present invention, such time interval is programmable. Preferably, there are two main types of power sequencing intervals: general power sequencing interval (hereinafter $T_i$) and Flat Panel power sequencing interval (hereinafter $T_j$). In general, a flat panel power sequencing may be required as a part of a general power sequencing. Such flat panel power sequencing may be required because a flat panel display (FPD) normally has two or three power supplies that must be enabled in a certain. order. As an example, for an FPD that requires two power supplies, a first power supply must be enabled, then the flat panel control signal and the flat panel data output signal must be enabled before the second power supply is enabled. The same counter can be used for both types of power sequencing interval because they occur at different times. Ti is controlled by bits PM00R[19:181] to have a duration of 16, 32, 64, or 128 PMCLK clock cycles. Tj is controlled by bits PM00R[21:20] to have a duration of 512, 1024, 2048, or 4096 PMCLK clock cycles. In the preferred embodiment, counter circuit 302 can further be used to determine the power sequence settling time which is the minimum waiting period between the end of a power up/power down sequencing and the next power up/power down sequencing. The power settling time is fixed to 4 PMCLK clock cycles.

State machine circuit 301 generates signal PMCE to enable or disable counter circuit 302. When enable signal PMCE is asserted HIGH, counter circuit 302 is enabled. Otherwise, when enable signal PMCE is deasserted LOW, counter circuit 302 is disabled after being reset. Clock signal PMCLK is used to drive counter circuit 302. Counter circuit 302 asserts signals PMCI and PMCJ, which are provided as inputs to state machine circuit 301, to indicate to state machine circuit 301 that intervals $T_i$ and $T_j$ have expired, respectively. Counter circuit 302 may further assert signal PMC2, which is also provided as input to state machine circuit 301, to indicate to state machine circuit 301 that counter circuit 302 has been enabled for 3 PMCLK clock cycles.

In general, state machine circuit 301 is used to determine and monitor the power states for PMU 205. Power state bits PMCSR[1:0] and signal PDWNLI, which are provided as inputs to state machine circuit 301, dictate the power state that PMU 205 is to be in. Bits PMCSR[1:0] and signal PDWNLI are decoded in state machine circuit 301 to generate power state signal PMD[4:0] which are actual inputs to state machine circuit 301. When the value of PMD[4:0] changes, it indicates that there is a change in power states and as a result, the power sequencing PM state machine will be triggered to execute a power sequencing to transition from an old power state to a new power state.

Figure 3A:
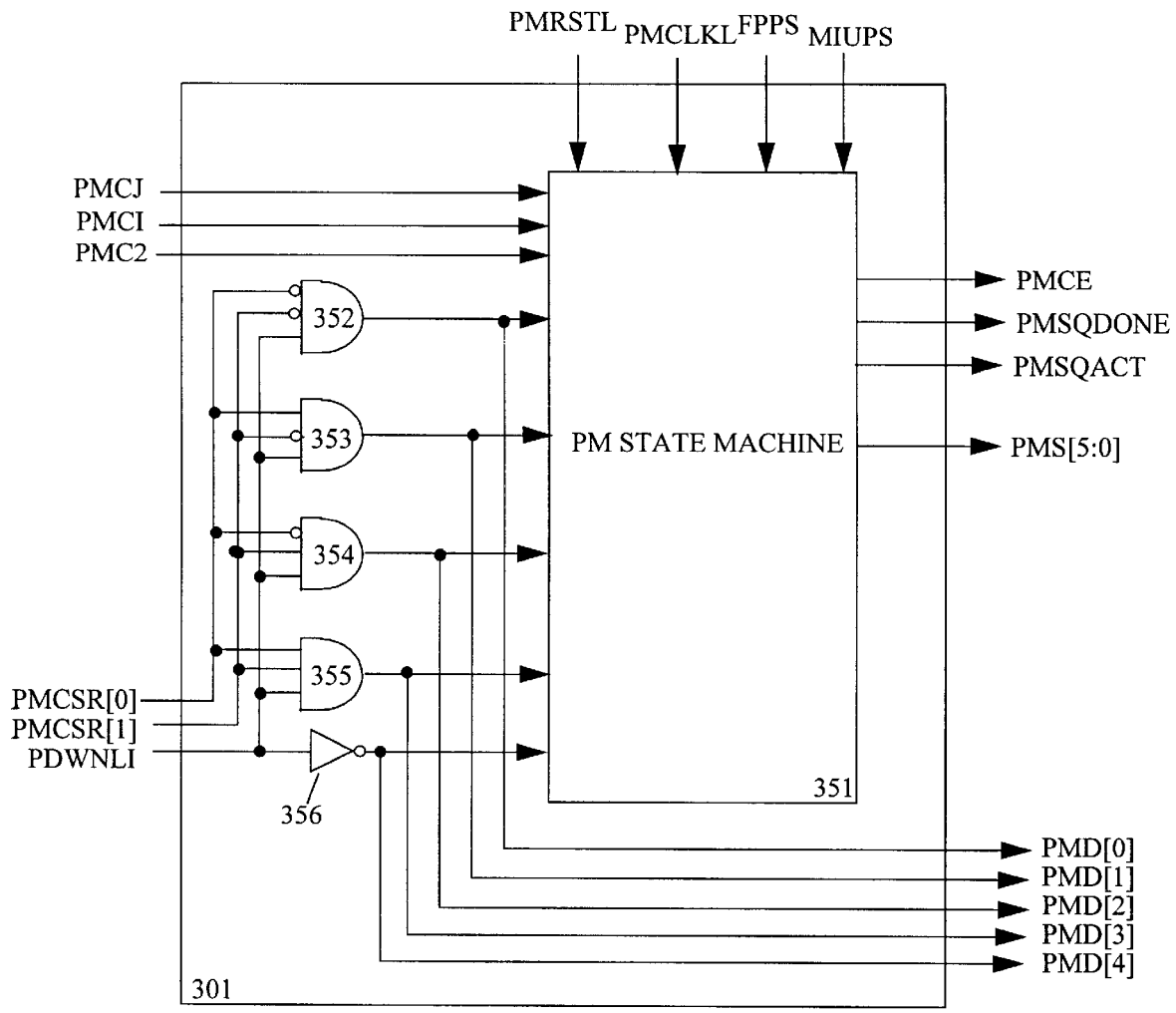
FIG. 3A is a diagram illustrating in greater detail state machine circuit 301 of FIG. 3.

Reference is now made to FIG. 3A illustrating in greater detail state machine circuit 301. As shown in FIG. 3A, state machine circuit 301 comprises PM state machine 351, AND-gates 352–355, and inverter 356. State machine circuit 301 receives input signals FPPS, MIUPS, PMCI, PMCJ, PMC2, PMCSR[1:0], PDWNLI, PMRSTL, and PMCLKL while it provides output signals PMD[4:0], PMS[5:0], PMSQDONE, and PMSQACT. AND-gates 352–355 and inverter 356 combine to decode bits PMCSR[1:0] and signal to generate power state signal PMD[4:0]. More particularly, the invert of bit PMCSR[0], the invert of bit PMCSR[1], and bit PDWNLI are provided as input to AND-gate 352 which outputs bit PMD[0]. Bit PMCSR[0], the invert of bit PMCSR[1], and bit PDWNLI are provided as input to AND-gate 353 which outputs bit PMD[1]. The invert of bit PMCSR[0], bit PMCSR[1], and bit PDWNLI are provided as input to AND-gate 354 which outputs bit PMD[2]. Bit PMCSR[0], bit PMCSR[1], and bit PDWNLI are provided as input to AND-gate 355 which outputs bit PMD[3]. Bit PDWNLI is provided to inverter 356 which outputs bit PMD[4]. PM state machine 351 receives as inputs signal PMRSTL, PMCLKL, FPPS, MIUPS, PMCJ, PMCI, PMC2, and power state signal PMD[4:0]. As discussed in greater detail below, PM state machine 351 generates as output signals PMCE, PMSQDONE, PMSQACT, and PMS[5:0].

Table 1 below provides the different power states generated by decoding power state bits PMCSR[1:0] and signal PDWNLI.

TABLE 1

| PDWNLI | PMCSR[1:0] | PMD[4:0] | Power State Name |
|---|---|---|---|
| 1 | 00 | 00001 | D0 |
| 1 | 01 | 00010 | D1 |
| 1 | 10 | 00100 | D2 |
| 1 | 11 | 01000 | D3 |
| 0 | XX | 10000 | D4 |

As shown in Table 1, there are five possible power states D0–D4 supported by PMU 205 in the preferred embodiment. Under the preferred embodiment, D0 (i.e., PMD[4:0] is 00001) is a normal power state, D1 is a first register controlled programmable power state (i.e., PMD[4:0] is 00010), D2 is a second register controlled programmable power state (i.e., PMD[4:0] is 00100), D3 is a software-controlled sleep power state (i.e., PMD[4:0] is 01000), and D4 is a hardware-controlled sleep power state (i.e., PMD [4:0] is 10000). As suggested by its name, during the normal power state D0, display/graphics controller 107 is in its normal functioning mode which generally means that all of its circuits and modules can be enabled (powered up). Power state D1 is a programmable power saving mode in which CIF 201 and PMU 205 are to be enabled while other circuits and modules in display/graphics controller 107 can be enabled or disabled as controlled by PM01R register. Because PM01R register is programmable by the user, the power sequencing associated with this power state is flexible in accordance to the present invention. Power state D2 is a second programmable power saving mode in which CIF 201 and PMU 205 are to be enabled while other circuits and modules in display/graphics controller 107 can be enabled or disabled as controlled by PM02R register. Because PM02R register is programmable by the user, the power sequencing associated with this power state is flexible in accordance to the present invention.

Power state D3 is a software controlled sleep mode in which power conservation is the objective. Accordingly, most circuits and modules in display/graphics controller 107 are disabled (powered down) including most sub-circuits in CIF 201. The only circuits and modules that remain enabled during power state D3 are the configuration registers in CIF 201, which contain PMCSR[1:0], and PMU 205. In addition, the memory refresh circuitry which is part of MIU 207 can be optionally enabled in D3 state as controlled by a programmable register bit. Preferably, power state D3 is the default state when display/graphics controller 107 is reset. Power state D4 is a hardware controlled sleep mode and the lowest power saving mode. To conserve power, practically all circuits and modules in display/graphics controller 107 are disabled (powered down) including all sub-circuits in CIF 201. The only module that remains enabled during power state D4 is PMU 205. Additionally, the memory refresh circuitry which is part of MIU 207 can be optionally enabled in D4 state as controlled by a programmable register bit.

As shown in Table 1, input signal PWDNLI is used to control the hardware controlled sleep mode D4. When signal PWDNLI is HIGH, it is combined with different permutations of bits PMCSR[1:0] to form four different power states (D0–D3). When signal PWDNLI is LOW, it can be combined with any permutations of bits PMCSR[1:0] to form the remaining power state (D4).

PM state machine circuit 351 further receives as inputs signals MIUPS, FPPS, and PMRSTL. Signals MIUPS and FPPS are used to trigger power sequencing when MIU 207 or FPI 209 is enabled/disabled, respectively. PM state machine 351 also receives signal PMCI, PMCJ, and PMC2 which are outputs of counter circuit 302. Signal PMRSTL, which is active LOW, is used to reset PM state machine 351. In addition to outputting signal PMCE and power states signals PMD[4:0] as discussed earlier, PM state machine 351 further outputs signals PMS[5:0], PMSQDONE, and PMSQACT. While signal PMSQACT indicates that the current general power sequencing is occurring, signal PMSQDONE indicates that the current general power sequencing is complete. State encoding signal PMS[5:0] is used to indicate all the states in PM state machine 351. Table 2 provides the machine states of PM state machine 351.

TABLE 2

| State Name | State Encoding PMS[5:0] |
|---|---|
| S00 | 000000 |
| S01 | 000001 |
| S02 | 000010 |
| S03 | 000011 |
| S04 | 000100 |
| S05 | 000101 |
| S06 | 000110 |
| S07 | 000111 |
| S10 | 001000 |
| S11 | 001001 |
| S12 | 001010 |
| S13 | 001011 |
| S14 | 001100 |
| S15 | 001101 |
| S16 | 001110 |
| S17 | 001111 |
| S20 | 010000 |
| S21 | 010001 |
| S22 | 010010 |
| S23 | 010011 |
| S24 | 010100 |
| S25 | 010101 |
| S26 | 010110 |
| S27 | 010111 |
| S30 | 011000 |
| S31 | 011001 |
| S32 | 011010 |
| S33 | 011011 |
| S34 | 011100 |
| S35 | 011101 |
| S36 | 011110 |
| S37 | 011111 |
| S40 | 1xx000 |
| S41 | 1xx001 |
| S42 | 1xx010 |
| S43 | 1xx011 |
| S44 | 1xx100 |
| S45 | 1xx101 |
| S46 | 1xx110 |
| S47 | 1xx111 |

As shown in Table 2, there are five main states S00 (D0), S10 (D1), 520 (D2), S30 (D3), and S40 (D4). They are highlighted for emphasis. In the preferred embodiment, the five main states are represented (encoded) by the three most significant PMS bits (i.e., PMS[5:3]). In the current embodiment, for each of these main states, there are seven associated sub-states Sx1–Sx7 where x=0-to-4. However, it should be clear to a person of ordinary skill in the art that other sub-states may also be associated with each of the main power state. All the sub-states Sx1–Sx7 are represented (encoded) by the three least significant PMS bits (i.e., PMS[2:0]). The corresponding state encoding values for the main and sub states in the current embodiment, which are carried by state encoding signal PMS[5:0], are also provided in Table 2.

State encoding signal PMS[5:0] and enable signal PMCE are provided as inputs to decoder 303 which decodes these signals to generate status signals PMP[7:1], PMD0X, PMD1X, and PMD2X.

Status signals PMP[7:1] are one-clock pulse signals indicating the beginning of the corresponding sub-states Sx1–Sx7 where x=0-to-4. Status signal PMD0X is asserted when PM state machine 351 is in states S00, S01, S02, S03, S04, S05, S06, and S07. Status signal PMD1X is asserted when PM state machine 351 is in states S10, S11, S12, S13, S14, S15, S16, and S17. Status signal PMD2X is asserted when PM state machine 351 is in states S20, S21, S22, S23, S24, S25, S26, and S27. Status signals PMP[7:1] are provided as inputs to clock enable circuit 304, memory enable circuit 305, display enable circuit 306, and flat panel enable circuit 307. Status signals PMD0X, PMD1X, and PMD2X are provided as inputs to display enable circuit 306.

Miscellaneous control register PM00R, D1 control register PM01R, and D2 control register PM02R are used to control whether a particular circuit or module is to be enabled or disabled during a power sequencing. In general, the bits in these control registers are assigned to specific circuits/modules that are to be enabled or disabled. For example, bits 0–3 of miscellaneous control register PM00R may be used to enable (power up) or disable (power down) the clock oscillator (OSCCLK), PLL1, PLL2, and PLL3, respectively. Since the control registers are programmable by the user, it allows selected circuits/modules to be enabled or disabled as desired in a power sequence.

In general, clock enable circuit 304 generates enable signals for the oscillator, PLL1, PLL2, and PLL3. Clock enable circuit 304 receives as inputs signals PMCLK, PMRSTL, PM00R[17:16, 3:0], PM01R[3:0], and PM02R [3:0]. In addition, clock enable circuit 304 also receives as inputs signals PMD[4:0], PMP[7], and PMP[1]. In the preferred embodiment, bits 0–3 of miscellaneous control register PM00R (i.e., PM00R[0:3]) are used to enable (power up) or disable (power down) the clock oscillator (OSCCLK), PLL1, PLL2, and PLL3, respectively. Bits 16–17 of register PM00R (i.e., PM00R[17:16] are used to enable/disable memory refresh of the frame buffer 202 during state D3 and state D4, respectively. Bits 0–3 of D1 state control register PM01R are used to enable/disable the clock oscillator (OSCCLK), PLL1, PLL2, and PLL3, respectively, in D1 power state. Bits 0–3 of D2 state control register PM02R are used to enable/disable the clock oscillator (OSCCLK), PLL1, PLL2, and PLL3, respectively, in D2 power state.

Using power state signal PMD[4:0] representing the desired PMU power state (e.g., main state) as well as status bits PMP[7,1] representing the beginning of sub-states Sx7 and Sx1 where x=0-to-4, clock enable circuit 304 determines whether to asserts enable signals PMOSCEN, PMPLL1EN, PMPLL2EN, and PMPLL3EN. Moreover, if these enable signals are to be asserted, clock enable circuit 304 determines the proper sequence that these enable signals are to be asserted. Signal PMRSTL is used to reset clock enable circuit 304. Clock signals PMCLK are used to synchronize and latch propagating signals in clock enable circuit 304.

Memory enable circuit 305 generates enable signals for the MIU, internal memory refresh, and internal memory restricted refresh. Memory enable circuit 305 receives as inputs signals PMCLK, PMRSTL, PM01R[4], PM02R[4], and MIUENA signal. In addition, memory enable circuit 305 also receives as input signals PMD[2:0], PMP[6], and PMP [2]. In the preferred embodiment, MIUENA is a register bit. When bit MIUENA is HIGH, it indicates that MIU 207 is enabled (if MIU 207 can be enabled in the present power state). When bit MIUENA is LOW, it indicates that MIU 207 is disabled. Bit 4 of D1 state control register PM01R is used to enable/disable MIU 207 in D1 power state. Bit 4 of D2 state control register PM02R is used to enable/disable MIU 207 in D2 power state.

Using power state signal PMD[2:0] representing the desired power state (e.g., main state) as well as status bits PMP[6,2] representing the status of sub-states Sx6 and Sx2 where x=0-to-4, and MIUENA signal, memory enable circuit 305 determines whether to asserts enable signal PMMI-UEN. Memory enable circuit 305 further generates signal MIUPS. Signal MIUPS is asserted HIGH when MIU 207 is enabled/disabled to indicate that MIU power sequencing is needed. More particularly, if MIU 207 is enabled, a power up sequencing is needed. If MIU 207 is disabled, a power down sequencing is needed. Signal PMRSTL is used to reset memory enable circuit 305. Clock signal PMCLK is used to synchronize and latch propagating signals in memory enable circuit 305.

Display enable circuit 306 generates enable signals for GE 206, display controller 208, and CRT DAC 210. Display enable circuit 306 receives as inputs signals PMCLK, PMRSTL, PM00R[8], PM01R[27,25,24,19,17,16,8,6], and PM02R[27,25,24,19,17,16,8,6]. In addition, display enable circuit 306 also receives as input signals PMD[2:0], PMP [3,5], PMD0X, PMD1X, and PMD2X. In the preferred embodiment, bit 8 of miscellaneous control register PM00R (i.e., PM00R[8]) is used to enable/disable GE 206 if GE 206 can be enabled in the present power state. Bits 6, 8, 16, 17, 19, 24, 25, and 27 of D1 state control register PM01R are used to enable/disable GE 206, CRT DAC 210, display controller 1, window 1 sub-module, cursor 1 sub-module, display controller 2, window 2 sub-module, and cursor 2 sub-module in D1 power state. Similarly, bits 6, 8, 16, 17, 19, 24, 25, and 27 of D2 state control register PM02R are used to enable/disable GE 206, CRT DAC 210, display controller 1, window 1 sub-module, cursor 1 sub-module, display controller 2, window 2 sub-module, and cursor 2 sub-module in D2 power state. Bits PMD0X, PMD1X, and PMD2X, when asserted, indicate whether state machine circuit 301 is in a main state or is transitioning to the D0, D1, and D2 main state, respectively.

Using power state signal PMD[2:0] representing the desired PMU power state (e.g., main state), status bits PMP[3,5] representing the beginning of sub-states Sx3 and Sx5 where x=0-to-4, signal DCDACENA, signal DC1ENA, and signal DC2ENA, display enable circuit 306 determines whether to asserts enable signals PMGEEN, PMDACEN, PMDC1EN, and PMDC2EN. Moreover, using status signals PMD0X, PMD1X, PMD2X, display enable circuit 306 determines whether to assert enable signals PMDC1WEN, PMDC1CEN, PMDC2WEN, and PMDC2CEN. More particularly, enable signals for the display controller 1 of display controller 208 include: PMDC1EN, PMDCLWEN, and PMDC1CEN. Enable signals for the display controller 2 of display controller 208 include: PMDC2EN, PMDC2WEN, and PMDC2CEN. If the enable signals above are to be asserted or deasserted, display enable circuit 306 determines the proper sequence that these enable signals are to be asserted. Signal DCDACENA is used to enable CRT DAC 210 when CRT DAC 210 can be enabled in the current power state. Signals DC1ENA and DC2ENA indicate whether the display controller 1 and the display controller 2 are to be enabled, respectively. Signal PMRSTL is used to reset display enable circuit 306. Clock signal PMCLK is used to synchronize and latch propagating signals in display enable circuit 306.

Flat Panel enable circuit 307 generates enable signals for FPI 209, flat panel power sequencing, and PWM enable. Flat panel enable circuit 307 receives as inputs signals PMCLK, PMRSTL, PM01R[9], PM02R[9], FPIENA, and DCFPIENA. In addition, flat panel enable circuit 307 also receives as inputs signals PMD[2:0] and PMP[5:3]. In the preferred embodiment, bit 9 of D1 control register PM01R (i.e., PM01R[9]) is used to enable/disable the flat panel display in the D1 power state. Similarly, bit 9 of D2 control register PM02R (i.e., PM02R[9]) is used to enable/disable the flat panel display in the D2 power state. FPIENA and DCFPIENA are control bits. When bit FPIENA is HIGH, it indicates that FPI 209 is enabled if FPI 209 can be enabled in the current power state. When bit DCFPIENA is HIGH, it indicates that either DC1 or DC2 of display controller 1&2 208, which is selected to drive FPI 209, is enabled.

Using power state signal PMD[2:0] representing the desired power state (e.g., main state), signal FPIENA, signal DCFPIENA, as well as status bits PMP[5:3] representing the beginning of sub-states Sx3, Sx4, and Sx5 where x=0-to-4, flat panel enable circuit 307 determines whether to asserts enable signals PMENVDD, PMENCTL, and PMENVEE. The enable signal for FPI 209 is PMENCTL. The enable signals for flat panel power sequencing include PMENVDD, PMENCTL, and PMENVEE. If these enable signals are to be asserted, flat panel enable circuit 307 determines the proper sequence that these enable signals are to be asserted. Flat panel enable circuit 307 further generates signal FPPS which is asserted HIGH when the flat panel display is enabled or disabled to indicate that flat panel power sequencing is needed. Signal PMRSTL is used to reset flat panel enable circuit 307. Clock signal PMCLK is used to synchronize and latch propagating signals in flat panel enable circuit 307.

Figure 4:
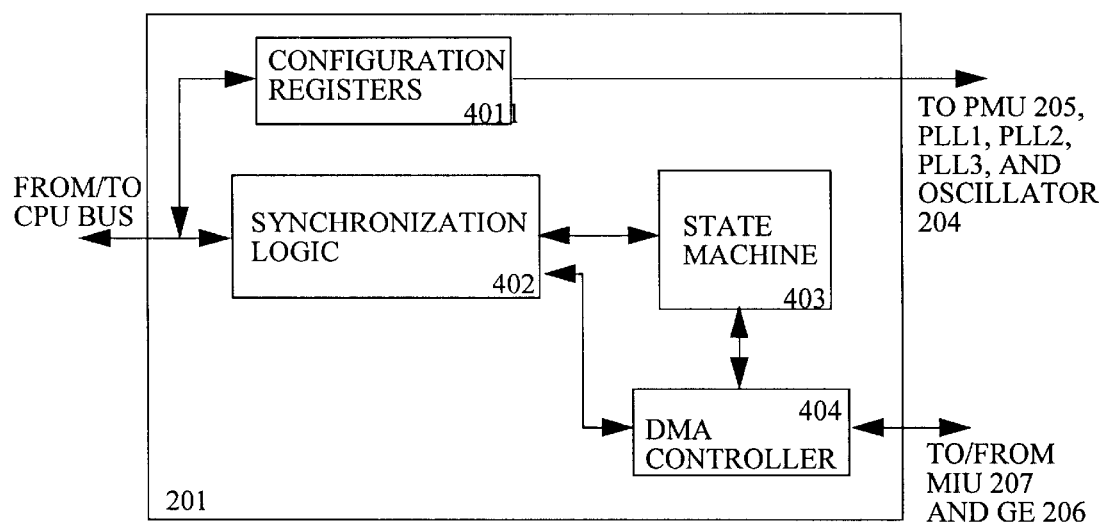
FIG. 4 is a block diagram illustrating in greater detail CPU Interface Unit 201 illustrated in FIG. 2.

Reference is now made to FIG. 4 illustrating in greater detail CIF unit 201 where the programmable registers in accordance to the present invention are implemented. CIF unit 201 comprises configuration registers 401, synchronization logic 402, state machine 403, and DMA controller 404. In general, CIF unit 201 receives register read/write requests and memory read/write requests from the CPU via a processor bus and carries out the requests accordingly. State machine 403 passes register read/write requests to the addressed register or the module where the addressed register is implemented. State machine 403 passes memory read/write requests to MIU 207 which in turn reads/writes data from/to frame buffer 202. DMA controller 404 under the control of state machine 403 is used to move the data from/to system memory (ROM/RAM) to GE 206 and MIU 207.

The different modules of display/graphics controller 107 namely CIF 201, MIU 207, GE 206, DC1 & DC2 208, FPI 209, etc. operate at different frequencies (and from that of the CPU) to suit the data/display requirements. As such, if CIF 201 interfaces to an asynchronous processor bus, it needs to synchronize the processor bus signals to the internal CIF clock before generating the appropriate control signals to each of the modules for register read/write operations and to MIU 207 for memory read/write operations. To be able to access the various registers or memory controllers, their internal clocks are traditionally enabled which results in increased power consumption because the associated oscillator and the PLLs for generating the internal clocks need to be enabled even when display/graphics controller 107 is in a low power state.

Under the present invention, synchronization logic 402 is used to interface the CPU with display/graphics controller 107. More particularly, synchronization logic 402 generates the timing signals according to an internal clock for a desired operation so that the operation can be carried out inside display/graphics controller 107. Such synchronization logic is well known in the industry and therefore is not described in further detail here. During a low power state such as the software controlled low power state D3 (the default power state upon reset) in the preferred embodiment, oscillator 204 and PLL circuit 203 which generate clock signals for display/graphics controller 107 are turned off for power conservation. As such, the internal clock required for the operation of synchronization logic 402 is not present.

Figure 5:
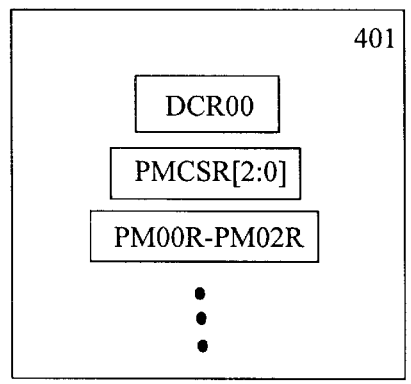
FIG. 5 is a block diagram illustrating the configuration registers in the configuration space of CPU Interface 201.

In accordance to the present invention, CIF unit 201 implements configuration registers 401 as part of the configuration address space that remains powered and accessible even during the low power state D3. Accordingly, the CPU can access to program configuration registers 401 even when oscillator 204 and PLL circuit 203 are turned off and still be able to conserve power. While in state D3, the CPU can access only the configuration address space. To be able to access the rest of the registers or memory, display/graphics controller 107 needs to be brought out of the D3 state to either D0, D1, or D2 state. Moreover, oscillator 204 and PLLs 203 need to be enabled to generate the required internal clocks. Using the programmed values in configuration registers 401, oscillator 204 and PLL circuits 203 are ready (i.e., enabled) for powering up. Moreover, using the programmed values, PMU 205 can transit from the low power state D3 to the normal state D0 which powers up oscillator 204 and PLL circuits 203 after they have been enabled. Referring now to FIG. 5 illustrating some of the most relevant registers in configuration registers 301 in accordance with the present invention. Device Configuration Register 00 (DCR00) stores programmed information on multiplication and division factors to be used in determining the clock rate associated with PLL1 of PLL circuit 203. Power management control/status register PMCSR is a 3-bit register which stores the programmed values that dictate the power state for display/graphics controller 107. The PMCSR binary values and their corresponding power states are discussed in Table 1 above. Power Management Control registers PM01R–PM02R store the programmed values to enable PLL circuits 203 (PLL2 & PLL3) as well as power state status information from PMU 205.

Figure 6:
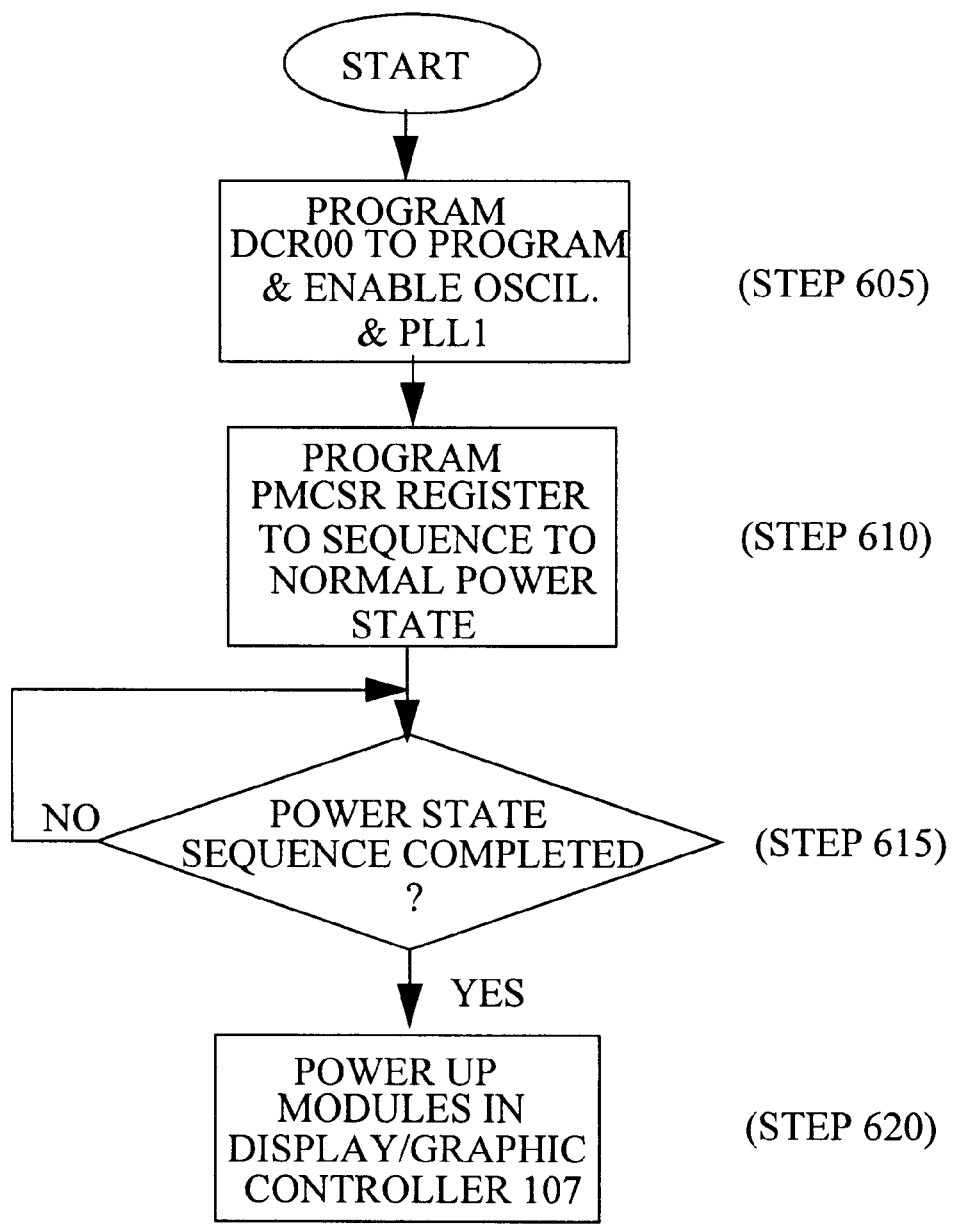
FIG. 6 is a flow chart of the steps to power up PLL circuits 203 and oscillator 204 when display/graphics controller 203 is presently in a low power state D3 in accordance to the present invention.

Referring now to FIG. 6 illustrating the programming steps to transition display/graphics controller 107 from D3 state to either D0, D1, or D2 state and to also power up PLL circuits 203 and oscillator 204 when display/graphics controller 203 is presently in a low power state D3 in accordance to the present invention. Because display/graphics controller 203 is in low power state D3, only the configuration address space is accessible by the CPU. In step 605, selected bits in the Device Configuration Register 00 (DCR00), which is part of the configuration address space, are programmed to set the parameters (e.g., multiplication and division factors) of PLL1 as well as to enable PLL1 and oscillator 204. The power management control/status register PMCSR is programmed to go from the low power state D3 to the normal power state D0 (step 610). Since the content of power management control/status register PMCSR is made available to PMU 205, PMU 205 responds by initiating the power state sequence to transition from the low power state D3 to the normal power state D0. The status of the power sequencing is sent to PMCSR register to be made available to the CPU. The CPU monitors the status of the power state sequence by monitoring the PMCSR register (step 615). If the power sequencing is completed. indicating that display/graphics controller 107 is now in the normal power state D0, the CPU is now ready to access the remaining register space of the chip. Otherwise, the CPU continues to monitor the PM00R register.

When the enable bits are used in combination with the control signals generated during the transition to the normal power state D0, PLL circuits 203 and oscillator 204 are powered on. The multiplication and/or division factors are used by the PLL circuits 203 in deriving the clock signals for PLL1, PLL2, and PLL3 (from PLL circuits 203) based on the reference clock signal generated by oscillator 204. The clock signal from PLL1 is used to drive the synchronous clock required by CIF module/unit 201. Upon entering normal state D0, the various modules in display/graphics controller 107 (e.g., MIU 207) that are associated. with the normal power state D0 are powered up (step 620). As an example, at power-up, the rest of CIF unit 201 including synchronization logic 302, state machine 303, and DMA controller 304 becomes accessible and operational to carry out the different tasks. In so doing, display/graphics controller 107, whose oscillator 204 and PLL circuits 203 have almost completely powered down in a low power state, can be programmed and enabled in the low power state prior to the transition to normal state. This makes a clock available at the time the chip enters the normal state thereby allowing the rest of the chip's register address space and modules to be accessed upon entering the normal state. Because no external clock signal is needed to enable PLL1 and oscillator 204 as well as to transition from the D3 state to D0 state, the present invention can be coupled either to a processor synchronous bus or to a processor asynchronous bus thereby improving the design's flexibility.

An embodiment of the present invention, a system, apparatus, and method for powering up the integrated circuit in its transition out of the low power state when the clock circuit supplying the clock signals is turned off is presented. While the present invention has been described in particular embodiments, the present invention should not be construed as limited by such embodiments, but rather construed according to the below claims.

What is claimed is:

1. An integrated circuit coupled to a central processor, the integrated circuit comprising:

a processor interface circuit providing an interface between the integrated circuit and the central processor, the processor interface circuit comprising a set of registers for storing programmed information from the central processor, the programmed information comprising information on a desired power state of the integrated circuit and enabling data bits, the set of registers being accessible during a first power state;

a power management circuit coupled to the processor interface circuit, the power management circuit controlling the desired power state of the integrated circuit in response to programmed information stored in the set of registers, the power management circuit supporting at least the first power state and a second power state, the power management circuit performing power sequencing to transition between two power states; and a clock generating circuit coupled to the processor interface circuit and the power management circuit, the clock generating circuit being controlled by the power management circuit and the programmed information stored in the set of registers, wherein during the first power state, the clock generating circuit is substantially disabled thereby powering down substantially all of the integrated circuit except for the set of registers and the power management unit for power conservation, wherein during the second power state, the clock generating circuit becomes operational in operating the integrate circuit.

2. The integrated circuit of claim 1, wherein during the first power state, the clock generating circuit is capable of being enabled and programmed thereby allowing the clock generating circuit to become operational in operating the integrated circuit during the second power state.

3. The integrated circuit of claim 2, wherein the clock generating circuit comprising:

an oscillator circuit for generating a reference clock signal; and a plurality of Phase Lock Loop (PLL) circuits coupled to the oscillator circuit, the plurality of PLL circuits generating derivation clock signals based on the reference clock signal.

4. The integrated circuit of claim 3, wherein the programmed information further comprising multiplication and division factors used by the PLL circuit in generating the derivation clock signals.

5. The integrated circuit of claim 4, wherein the central processor writing programmed information into specific locations in the set of registers according to a predetermined sequence based on monitored events.

6. The integrated circuit of claim 5, wherein the integrated circuit is a display/graphics controller.

7. A computer system comprising:

a central processing unit (CPU);

system memory coupled to the CPU;

a graphics/display controller coupled to the CPU and the system memory, the graphics controller comprising:

a processor interface circuit providing an interface between the graphics/display controller and the CPU, the processor interface circuit comprising a set of registers for storing programmed information from the central processor, the programmed information comprising information on a desired power state of the integrated circuit and enabling data bits, the set of registers being accessible during a first power state;

a power management circuit coupled to the processor interface circuit, the power management circuit controlling the desired power state of the integrated circuit in response to programmed information stored in the set of registers, the power management circuit supporting at least the first power state and a second power state, the power management circuit performing power sequencing to transition between two power states, and a clock generating circuit coupled to the processor interface circuit and the power management circuit, the clock generating circuit being controlled by the power management circuit and the programmed information stored in the set of registers, wherein during the first power state, the clock generating circuit is substantially disabled thereby powering down substantially all of the integrated circuit except for the set of registers and the power management unit for power conservation, wherein during the second power state, the clock generating circuit becomes operational in operating the integrated circuit.

8. The computer system of claim 7, wherein during the first power state, the clock generating circuit is capable of being enabled and programmed thereby allowing the clock generating circuit to become operational in operating the integrated circuit during the second power state.

9. The computer system of claim 8, wherein the clock generating circuit comprising:

an oscillator circuit for generating a reference clock signal; and a plurality of Phase Lock Loop (PLL) circuits coupled to the oscillator circuit, the plurality of PLL circuits generating derivation clock signals based on the reference clock signal.

10. The computer system of claim 9, wherein the programmed information further comprising multiplication and division factors used by the PLL circuit in generating the derivation clock signals.

11. The computer system of claim 10, wherein the central processor writing programmed information into specific locations in the set of registers according to a predetermined sequence based on monitored events.

12. A method to power up modules in an integrated circuit coupled to an central processor via a processor interface circuit, wherein a clock generating circuit used in generating clock signals for the integrated circuit is substantially disabled when the integrated circuit is in a first power state for power conservation, the method comprising:

writing programmed information to a register set to program and enable the clock generating circuit;

writing programmed information indicating a change to a second power state from the central processor into a first location in a set of registers in the processor interface circuit, the set of registers being accessible during the first power state, wherein only the set of registers and the power management unit in the integrated circuit are powered up during the first power state;

in response to the programmed information indicating the change to the second power state, performing a power sequence to transition from the first power state to the second power state and powering up the clock generating circuit;

in response to the power sequencing and the powering up of the clock generating circuit, a first internal clock is active, and all modules in the integrated circuit are capable of being enabled, powering up selected modules in the integrated circuit that are associated with the second power state.

13. The method of claim 12 further comprising the step of writing multiplication and division factors from the central processor into a third location in the set of registers, the multiplication and division factors used by the clock generating circuit to derive clock signals based on a reference clock signal.

14. The method of claim 13, wherein the steps of writing programmed information indicating a change to the second power state, writing enabling data bits, and writing multiplication and division factors from the central processor into specific locations in the set of registers followed a predetermined sequence based on monitored events.

* * * * *